United States Patent [19]
MacKay

[11] 3,831,295
[45] Aug. 27, 1974

[54] POINT-VECTOR CONCEPT ASSESSMENT METHOD AND APPARATUS

[76] Inventor: George R. MacKay, 575 Holly Ln., Paradise, Calif. 95969

[22] Filed: Oct. 4, 1971

[21] Appl. No.: 186,071

[52] U.S. Cl.................... 35/22 R, 35/35 H, 35/73, 35/7 A
[51] Int. Cl. ............................................. G09b 1/08
[58] Field of Search............ 35/22 R, 21, 18 A, 7 A, 35/35 R, 35 H, 35 J, 24, 73

[56] References Cited
UNITED STATES PATENTS

| | | | |
|---|---|---|---|
| 3,186,323 | 6/1965 | Niehaus | 35/7 A UX |
| 3,514,873 | 6/1970 | Stobbe | 35/7 A X |
| 3,461,573 | 8/1969 | Stibal | 35/34 |
| 3,339,297 | 9/1967 | Stinn et al. | 35/73 |
| 3,270,430 | 9/1966 | Hurst | 35/35 H |
| 3,380,177 | 4/1968 | Wagner | 35/24 |

*Primary Examiner*—Wm. H. Grieb
*Attorney, Agent, or Firm*—Schatzel & Hamrick

[57] ABSTRACT

A point-vector morphogenic method and apparatus for the objective recording and assessment of verbal and non-verbal mental processes and concepts. The apparatus includes a plurality of open system semantic vehicles and containment field adapted for the assessment of concepts and their infinite combinations relative to a given concept and each other. The open system principle permits the subject or the assessor to personalize a program by adding new relevant semantic vehicles of his choice within the field at select positions. The containment field structure includes a central reference point or nucleus representative of the concept to be examined and is adapted to receive said semantic vehicles relative to said central point. Each of the said semantic vehicles carries a defining concept. The semantic vehicles are adapted for placement within said containment field at any point relative to said nucleus as selected by the subject such that said markers individually and in combination establish a point-vector pattern. The apparatus is so adapted that all possible program assessments may be performed by the subject individual within the bounds of the containment field in relationship to the central nucleus.

3 Claims, 13 Drawing Figures

INVENTOR.
GEORGE R. MacKAY
BY Thomas Schatzel

POINT-VECTOR CONCEPT ASSESSMENT METHOD AND APPARATUS

BACKGROUND OF THE INVENTION

The present invention relates to a morphogenic method and apparatus for the objective recording and assessment of specific features of the content, deep structure, surface form and dynamics of mental processes or concepts and their linear and cluster or polydimensional functions in perception, language and personality.

The present invention relates to a method and apparatus for the objective recording and assessment of perception and concept formation as functions of an individual's personality traits, attitudes, feelings and values. The inherited and acquired traits and their derivatives are integral properties of a person; they refer to actual neuropsychic characteristics which shape the subject's thought and behavior patterns. The personality traits do not act as independent entities within the person but function as an interdependent set of attributes which combine to produce behavorial effects. The internal personality traits, attitudes, feelings and values of the individual combine to form a coherent polydimensional cluster which may be viewed as an interrelated system establishing an organized whole. This dominant unitary structure is contained in the single concept of the self.

The present invention provides for a morphogenic psychology method and apparatus for the objective recording and assessment of the internal organization of the personality structure of an individual subject as reflected in the individual's concept of himself.

Personality may be further defined as the dynamic organization within the individual of those psychophysical traits, disposition systems or characteristic tendencies that guide the subject's actions or reactions in certain ways that define his unique adjustment to his environment. The psychophysical trait systems include the genetic and constitutional capacities, modified by experience, for cognition, perception, conception, affection, conation, kinesthesia and social behavior whose synergic activity produces among an almost infinite variety of concepts, the concept of the self, or the self concept, the symbolic organization of the personality which is amendable to morphogenic point-vector assessment. The symbolic organization of the person, the self-image, or the self-concept is also known as the self structure and the individual's system of concepts as regarding himself and his environment. The range of trait contents includes motives, abilities, temperament and style. Some descriptive terms of traits are - shy, aggressive, submissive, lazy, melancholy, easy-going, ambitious, and so on. Traits may refer to surface manifestations such as aggressiveness, or to deeper or more inferential qualities such as beliefs.

It is known that there are a number of fundamental reasons for the assessment of the deep structure of concepts as functions of personality. First, concepts and perceptions generated by the genetic and constitutional trait system act in turn to modify it. Concepts act as motivators, contain value systems, generate and give direction to thought and behavior; sustain mental, emotional and physical health or cause illness. Second, concepts function as personality stabilizers in a milieu of change. Third, a high degree of human communication depends on the capacity of personality to form verbal concepts and to receive graphic and phonic semantic vehicles and reconstruct their concept patterns in the form of deep semantic structures of meaning. Fourth, the origins of social behavior are in mental processes or concepts; cultural things and personal feelings appearing these mental operations. Fifth, the personality structure of the individual and its capacity to form concepts are critical factors in social homeostaces such that the balance of a given group or society in a lilieu change is dependent on the capacity of its members to generate and share common concepts, values, interests and aspirations.

The present invention provides for a morphogenic psychology method and apparaus for assessing the capacity of the individual's minding process to form concepts and perceptions, i.e., to receive sensations, to give them meaning and to respond to them. In social psychology the method and apparatus are used to record and assess the way personality and behavior are influenced by the persons attitudes, social characteristics or social setting. In sociology the method and apparatus may be used to discover how the psychological properties of every man, or the personality dispositions of particular men acting in a situation influence the outcome of the social process.

In psycholinguistics, the method and apparatus are used to discover the content, structure and dynamics of an individual's language acquisition system and its transformational grammer. In general semantics, the method and apparatus may be used to discover the deep semantic structure of meaning made in response to symbols or semantic vehicles.

The present invention provides a point-vector method and apparatus for the objective assessment of the dynamics underlying an individual's human behavior. The apparatus permits an objective assessment by the individual himself or/and by other persons.

Systems heretofore available for the discovery and assessing of the content, deep structure, surface form and dynamics of mental processes or concepts and their linear and polydimensional functions in perception, language and personality have relied on hypothetical descriptions and tests requiring elaborate time consuming translation. For example, one of the desirable goals of statistical analysis in differential psychology is the reconstruction of the relationships of the variables into constellations or patterns in such a way as to produce an individual paradigm of personality for visual analysis. Such a personality model must be reconstructed or synthesized from a more or less piecemeal manipulation of isolated traits. The more ambitious the research becomes and the more traits that are included in the study, the more cumbersome and less possible it becomes to perform the assessments and reconstruct the variables.

SUMMARY OF THE PRESENT INVENTION

The present invention provides a point-vector concept assessment method and apparatus adapted to permit a subject individual to define for himself the nature of that totality which he is, while better preserving the sense of wholeness and uniqueness of the personality system. The point-vector concept assessment method and apparatus permits the assessment to go directly to the solution without the necessity for intermediate stes. The subject individual's cognitive, affective and psychomotor personality functions are engaged in the process of directly constructing an objective polydimensional point-vector pattern of the content, deep structure, surface form and dynamics of mental processes or concepts, perception, language and personality undistorted by piecemeal testing or elaborate reconstruction procedures.

The present invention provides for the assessment of the content, deep structure, surface form and dynamics of the psychonuclear and psychoatomic systems underlying human behavior where content, deep structure, surface form and dynamics are defined as critical elements in the non-linear polydimensional syntax patterns of mental processes or concepts. The point-vector pattern assessments support the theory that intellect starts with conception - the neuropsychic process that forms and structures the deep concept or fundamental unit of thought.

The present invention provides for a morphogenic method and apparatus for the objective assessment of the internal organization and surface form of single concepts, concepts in clusters and concepts in strings. When the point-vector device carries a verbal program for a single concept, the individual subject starts with a central organizing factor. The central organizing factor serves as the nucleus or anchor point and may be in the form of a semantic vehicle carrying the name of the concept or fundamental unit of thought to be assessed. The apparatus permits the subject individual guided by the complex cognitive, affective and psychomotor functions of his personality, to construct a finished objective planar or global polydimensional model by relating other defining points to the anchor point and to each other. The individual defining points may be demonstrated by semantic vehicles carrying terms relative to the anchor point. The placement of the individual points indicate the relationship given said point by the subject individual. The finished polydimensional point-vector paradigm of the semantic vehicles displays within its internal structure and surface the semantic definitions carried on its points and their interdependent relationships needed to define the concept or perception. The points nearest the anchor point contribute more weight to the meaning or definition of the concept or perception than those points lying further away from the nucleus or anchor point.

A similar process may be used to discover the content, deep structure, surface form and dynamics of the more complex multiconcept structures found in language and personality. When the point-vector assessment device carries a language acquisition system assessment program, the individual treats each word or semantic vehicle in the expression system or sentence surface structure as a separate but interacting anchor point or nucleus. The defining cluster of concept bearing points are organized around the nucleus by relating each point in the language acquisition system assessment program to the appropriate nucleus and to each other. The finished planar or global polydimensional point-vector pattern paradigm of the underlying sentence structure displays a string of deep concepts or fundamental units of thought characterized as a string of nuclear semantic vehicles surrounded by psychoatomic cluster of patterns of denotive and connotative definitions, the interacting linear linkage patterns of a universal generative, transformational or deep grammar and the universal polydimensional patterns of the deep semantic structure of meaning.

When the point-vector pattern apparatus is utilized for a personality assessment program, the subject evaluates each semantic vehicle within the context of a sentence. For example, the meaning of the term "cheerful" would be derived from its location in the sentences - "I am cheerful," or "I am not cheerful." Or the terms can be thought of by the subject as descriptive of the subject or not descriptive of the subject. The content, deep structure, surface form and dynamics of the symbolic organization of the person are assessed by starting with the central organizing factor. The central organizing factor serves as the anchor point or nucleus and may be in the form of a semantic vehicle bearing the name of the mental process or concept to be analyzed. The individual then works within the unstructured open field proximal and distal containment circle or within said same circle structured with a central nuclear point whichever serves the purpose of the assessment. The subject builds a polydimensional planar or global point-vector pattern by placing the self point in the center of the containment field. The subject continues to build the pattern by relating the position of the various points in the personality assessment program to the said self point and to each other. The result is a graphic polydimensional portrayal of the internal world of the individual, portraying the way the subject experiences himself in terms of the program. The portrayal is not distorted by scoring, summarizing, pattern reconstruction or other such intermediary techniques. The finished paradigm does not require statistical correlation studies for assessment. Percise measurement is accomplished with quantative vector grids. Measures of the individual's traits, attitudes, self-esteem, values, beliefs, purposes, interests, aspirations and so forth, may be obtained by direct visual inspection of the patterns or, if desired, by mathematical translation and computer analysis.

The invention provides for a morphogenic point-vector method and apparatus for the assessment of personality dynamics (personality in motion) and change within the structure of single concepts, concepts in strings and concepts in clusters. Motion within semantic space, in language acquisition systems and personality structure is demonstrated by comparing various recordings made at different intervals over a period of time. The various recordings may be compared by any of various methods. The recordings may be overlapped on an overhead projector or projected in a kinetoscope used as elements in animated film, or programmed for computer and/or holographic display to show areas of movement and areas of stability.

The present method and apparatus provides for direct arrangement and recording of an objective nonlinear polydimensional point-vector assessment pattern indicative of personality traits of the subject individual. The invention permits the subject individual to be free of the linear restrictions of speech and writing and permits reliance on intuitive responses to assist in creating and organizing an isomorphic recorded pattern of personality traits in polydimensional space relative to a nucleus. The individual's traits may be carried by semantic vehicles such as sign, symbol, image, shape, color, sound, tactile, olfactory, temperature, number, code or other natural and artificial language indices which are recorded in a field relative to the nucleus by the subject. A quantitative vector system may be employed to evaluate the recorded pattern.

The present invention provides for a method and apparatus which lends itself to research in the sciences, arts and humanities. It further lends itself to polydimensional diagnostic purposes by doctors, psychiatrists, psychologists and counselors or nondiagnostic assessment by individual subjects themselves.

An exemplary embodiment of the apparatus of the invention includes a containment field structure comprised of a substantially circular planar disc having a central reference nucleus. The field structure is adapted to a central reference nucleus marker bearing the concept or fundamental unit to be assessed. The field structure is further adapted to receive and record the individual semantic vehicles. The individual semantic vehicles, which may be in the form of a plurality of markers, each representative of a personality trait, may be recieved by the field structure at any position within the field selected by the individual subject. The individual semantic vehicles may be recorded within the field along any field coordinates and at any select position relative to the nucleus and/or to any other recorded vehicle. The individual semantic vehicles establish a point and vector relative to the nucleus. The individual vehicles may be recorded individually, successively or simultaneously.

The field structure and vehicles are further adapted to permit alteration of the recorded position of any one or plurality of vehicles at any time during the formation of the point-vector pattern by the subject individual. Any number of semantic vehicles may be recorded within the field at the choice of the subject individual. The recorded vehicles establish a polydimensional pattern of the personality traits of the subject individual.

The present point-vector pattern assessment system provides the capabilities of recording subtle changes in cognitive and emotional organization of personality. The minding process is freed from the linear restrictions of speech and writing. The subject individual need rely on his intuitive responses to assist his organization of the isomorphic pattern in the polydimensional space of the point-vector device.

The points in the point-vector device are carriers of semantic vehicles, the symbols of concepts or qualities of experience. The vectors are points in motion animated by the force of intuition generated by the fusions of the cognative, affective, conative, kinesthetic and behavior functions of the individuals personality. The cognitive function is the ultimate qualitative aspect of consciousness, the capacity to know "what it is," and to organize by classification. It includes all the ways of knowing about the program bearing points; perceiving, conceiving, imagining, comparing, relating, reasoning, cognitive dissonance, and so forth. The affective function provides the emitional or preferential feeling element in experience, the "I like," or "I dislike," aroused by the content of the points. It is the capacity to make value judgments and to organize the point-vector device by feeling the preferential relationships between the qualities of experience carried on the points. The conative function is the voluntary preferential action response elicited and motivated by the press of the combined cognitive and affective influences to move a point above or below, to the right or left, or toward or away from the anchor point or to relate a point in a preferential manner to the rest of the points in the developing morphogenic point-vector pattern construct. The kinesthetic function provides the individual's perception of the sensation of position, movement, tension, and so forth, of parts of the body perceived through the nerve end organs in muscles, tendons and joints. It guides the objective process of relating the points by fitting them into the exact desired relationship to the anchor point or nucleus and to each other. The behavior function provides the empirical evidence the observable act of organizing the physical polydimensional global or planar point-vector pattern device as perceived by the individual subject.

BRIEF DESCRIPTION OF THE DRAWINGS

FIG. 1A is an enlarged view of a marker of FIG. 1;

FIGS. 1B–1E are views of grid assessment sheets of various forms;

FIG. 1F is a view of the structure of FIG. 1 with the grid assessment sheet of FIG. 1C over the containment field for recording;

DESCRIPTION OF PREFERRED EMBODIMENTS

Figure 1:
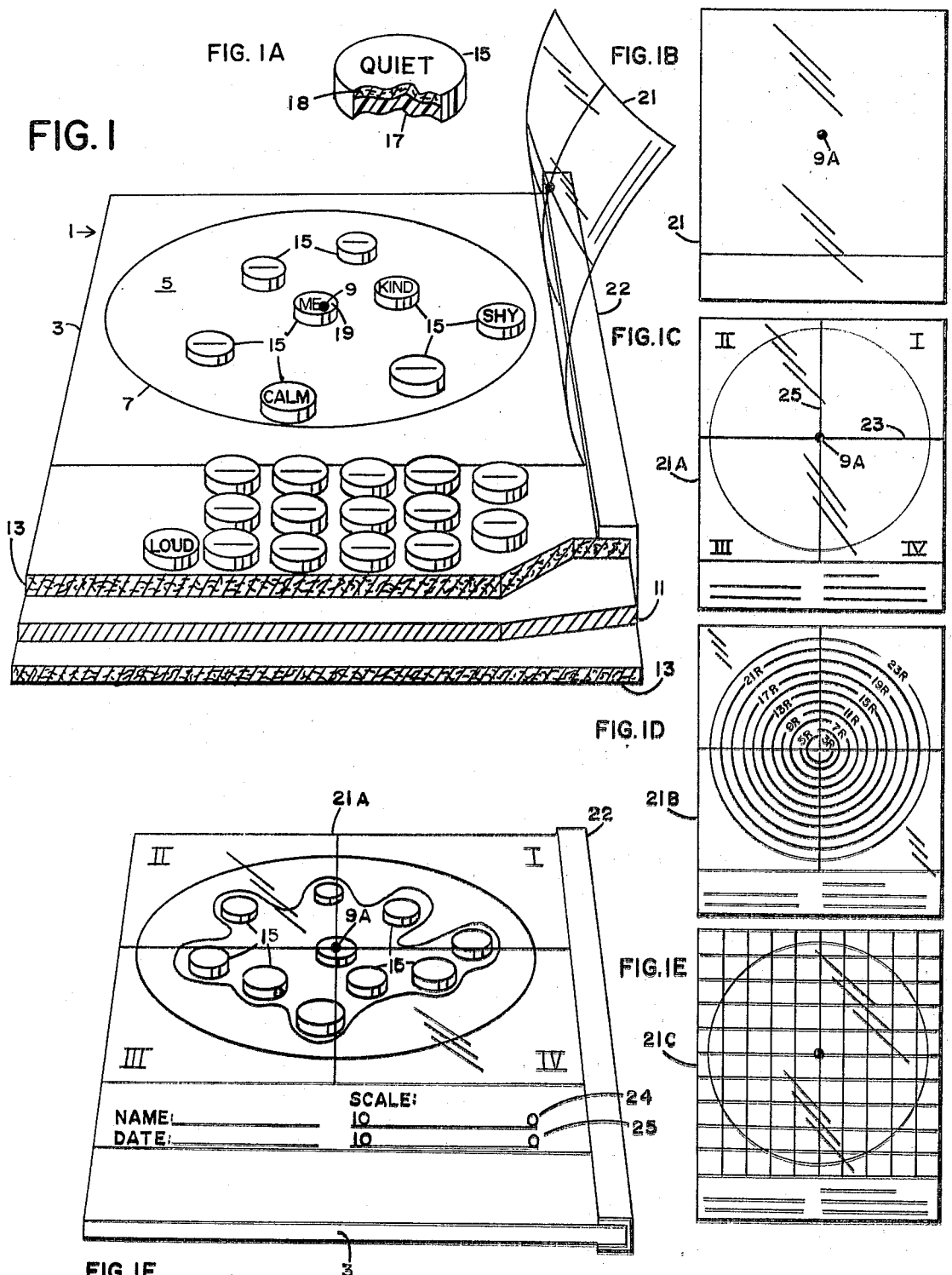
FIG. 1 is a view in perspective of a planar containment field structure and a plurality of markers of the present invention.

Referring to the drawings, FIG. 1 is a perspective view of a point-vector assessment system, referred to by the general reference character 1, and incorporating the teachings of the present invention. The system 1 includes a support structure 3 supporting a circular planar containment field structure 5 having an outer peripheral edge 7 and central point 9 for placement of a semantic vehicle indicting the anchor point or nucleus unit of thought to be assessed. The support structure 3 is comprised of a rectangular metallic sheet 11 covered over its entirety with an aesthetic coating 13, e.g., paint or paper. The support structure is preferably flexible to permit making a permanent record by a copy machine as hereinafter described.

The system further includes a plurality of individual semantic vehicles in the form of place marker discs 15. The place markers 15 are adapted for manipulation by the individual subject and movement from outside the periphery edge 7 to any place within the interior of the field 5. The markers 15 are adapted to adhere to the surface of the field structure 3 such that when placed within the field 5, the markers 15 are adapted to adhere to the surface of the field structure 3 such that when placed within the field 5, the markers retain their position unless a force, e.g., hand pressure, is applied. In the embodiment 1, the markers 15 are composed of permanent magnets 17 to establish a magnetic attraction with the sheet 11. The magnets 17 are coated with an aesthetic surface coating 18. The markers 15 are selected to be of a size to permit a large number of markers 15 to be placed within the containment field 5. The magnets 17 of the markers 15 are selected such that the magnetic attraction force between the markers 15 and the sheet 11 exceed that of the markers to each other such that when the markers are positioned within the containment field the attraction of the magnets to each other does not cause the markers to move without the aid of an external force. The markers 15 each bear on their surface a semantic term in the form of a personality designation imprinted thereon. The designation may take any of various forms, e.g., a sign, symbol, image, shape, color, number, code, and so forth. Each marker 15 is designated with a different personality trait and when positioned within the containment field 5 establishes a point and vector relative to the nucleus 9 and to rest of the markers in the field.

The central marker 15 hereinafter refered to as the "ME" marker 19 is provided for positioning at the central point 9 to indicate that the subject individual himself is being assessed. The "ME" marker 19 is retained in place to designate the nucleus or anchor point for reference. The subject individual guided by the cognitive and affective functions of his personality constructs the point-vector pattern by relating the semantic term on each marker 15 to the anchor point and the peripheral edge 7 of the field 5. The subject individual may also relate the semantic terms of the semantic vehicles to each other when placing the markers within the field 5. The markers 15 nearest the anchor marker 19 may be viewed as contributing more weight to the meaning or definition of the concept or perception than those lying farther away from the center or anchor point.

In operation, the content, deep structure, surface form and dynamics of the symbolic organization of the subject individual are assessed by starting with the central organizing factor, an anchor point or nucleus being the name of the mental process or concept, for example, the "I" or "ME" marker 19 which is that part of the personality the subject individual considers to be himself. The subject individual then works within the open field containment circle 5 placing each of the markers 15 individually at select locations to construct his own polydimensional planar point-vector assessment pattern relative to the nucleus point 19 and to each other within the containment field 5. Each placed marker 15 establishes a magnitude and angular relationship to the nucleus reference and each other. The resultant point-vector pattern is a graphic picture of the internal world of the subject individual disclosing the way he experiences himself in terms of the semantic vehicles in the program.

The system 1 further includes a plurality of assessment transparent sheets adapted for positioning overlaying the containment field after the subject individual has arranged the various semantic vehicles 15. FIG. 1 illustrates a transparent sheet 21 held in place by a gripper 22 along one lateral edge. The sheet 21, reproduced in FIG. 1B, may take the form of a clear sheet with a central point 9A for alignment with the nucleus 9. In the alternative, a sheet 21A as shown in FIG. 1C may be used which carries reference pattern in the form of a horizontal grid 23 and a vertical grid 25 intersecting at the point 9A to establish four quadrants designated I, II, III and IV. This permits an angular assessment of the pattern and the various points. A further embodiment of a sheet 21B, as shown in FIG. 1D carries a reference pattern in the form of eleven equally spaced circles concentric with the point 9A and designated 100 percent, 90 percent, 80 percent, 70 percent, 60 percent, 50 percent, 40 percent, 30 percent, 20 percent, 10 percent and 0 percent. The radius of the circles is selected in reference to the radius of the markers 15. The circle designated 100 percent has a radius of approximately three times the radius of the markers 15 such that assuming the markers 15 have a radius $r$, the radius of the circle 100 percent is approximately $3r$. Similarly the circle designated 90 percent has a radius $5r$, the circle 80 percent has a radius $7r$, the circle 70 percent has a radius $9r$, the circle 60 percent has a radius $11r$, the circle 50 percent has a radius $13r$, the circle 40 percent has a radius $15r$, the circle 30 percent has a radius $17r$, the circle 20 percent has a radius $19r$, the circle 10 percent has a radius $21r$, and the circle 0 percent has a radius $23r$. The circle 0 percent is of the same radius of the circle 7, i.e., the radius of the containment field 5. The sheet 21B may be utilized to indicate both an angular and magnitude placement of a marker relative to the nucleus 9A. A further embodiment of a sheet 21C is shown in FIG. 1E illustrating horizontal and vertical grid references. This reference pattern provides both a magnitude and angular relationship.

During the placement of the markers 15 by an individual subject the secured about sheet 21 may be folded back away from the field 5. Upon completion of construction of the point-vector assessment pattern the assessment sheet may be folded over the top of the field 5 as shown in FIG. 1F. When folded over the top of the structure 3, the relative position of the markers 15 of the pattern may be related to the grid pattern of the assessment sheet 21 as illustrated by FIG. 1F, in FIG. 1F, the assessment sheet 21A is illustrated. Likewise, the various other assessment sheets may also be used. With the assessment sheet 21 in place, the imprinted character designation on the markers 15 may be read through the sheet 21. The sheet 21 may further be composed of a material adapted for marking, e.g., with a crayon to permit the subject to outline the surface form of the deep structure and content pattern established by the markers 15. The name of the subject individual, date, a 0 to 10 self rating scale 24 and a degree of acceptance scale 25 may all be indicated on the top surface of the sheet 21. Accordingly, to make a permanent recording of the pattern of the markers 15, a picture may be recorded of the structure with the sheet 21 overlapping as illustrated by FIG. 1B. This recording may be made by conventional photocopying machines or other pictorial recording apparatus. After the picture is recorded, the temporary outline marking on the sheet 21 may be erased such that the apparatus 1 may be used by another subject. The subject individual may periodically repeat the process and evaluate the recorded pictures of the patterns. The apparatus 1 may also be used by a plurality of different subject individuals and a recording made of the results without interference with the recordings of the subjects previously or subsequently made.

Figure 2:
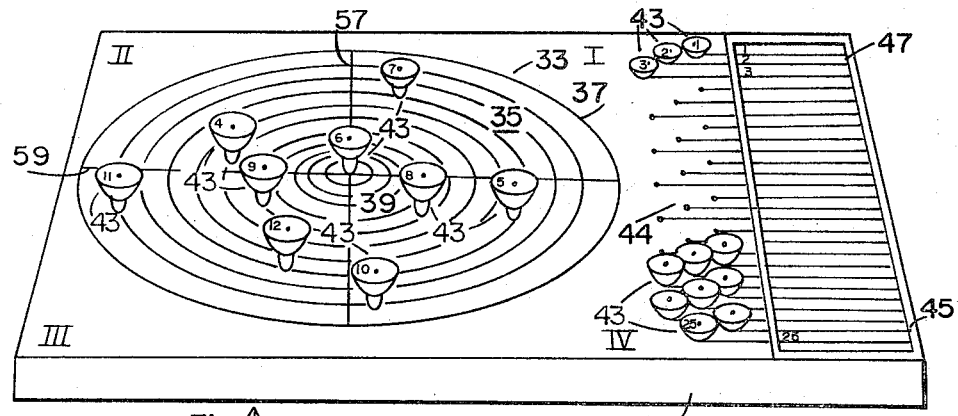
FIG. 2 is an alternative embodiment of the present invention.
Figure 2B:
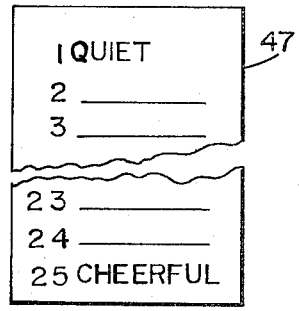
FIG. 2B is an enlarged view of a semantic vehicle card of the embodiment of FIG. 2.
Figure 2A:
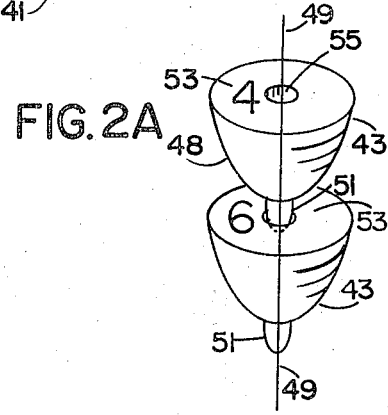
FIG. 2A is an enlarged view of a semantic vehicle indicator of the embodiment of FIG. 2.

FIGS. 2, 2A and 2B illustrate an alternative point-vector assessment system of the present invention, referred to by the general reference character 31 and incorporating the teachings of the present invention. The system 31 includes a planar containment field structure 33 having an outlined central circle 35 with an outer peripheral edge 37 and a central point 39. The field structure 33 is supported on a rectangular support member 41. The member 41 further supports a plurality of numbered semantic vehicles in the form of a plurality of pegs 43, further illustrated in FIG. 2A, supported in rows and columns to the side of the field structure 33 in a peg-supported area 44. The member 41 further supports a well 45 to the side of the peg-supported area 44 to receive a plurality of cards 47 each carrying a list of personality trait designations. Each of the cards 47 carries a list of numbers to coincide with the trait designations and the numbers on the pegs 43 for cross-reference between the pegs and trait designation cards. For example, the card 47 of FIG. 2B carries the cross-reference numbered 25 to relate to the peg 25.

The field structure 33 may be comprised of a peg board to receive the pegs 43. The pegs 43, as illustrated in the enlarged view of FIG. 2A may be comprised of a circular shaped body 48 having an axis 49 and tapered to a stem 51. The body 48 has a top surface 53. Each individual peg 43 carries an identification reference numeral on the top surface 53 which identification reference numeral is cross-referenced to the coinciding character trait list card 47. Each peg 43 further carries a well 55 opening to the top surface 53 and coaxial with the axis 49. The well 55 is adapted to receive the tapered stem 51 of another peg 43 such that pegs 43 may be superimposed as illustrated in FIG. 2A. Accordingly, if a subject individual elects the same position within the containment field for placement of two or more semantic vehicles, the selected pegs 43 may be superimposed.

The field structure 33 carries an assessment and pattern including a set of orthogonal lines 57 and 59 dividing the field into the four quadrants I, II, III and IV. The grid pattern further includes a number of circles coaxial with the point 39 to establish a positional reference zone relative to the central point 39 such that pegs 43 representative of a designated trait may be positioned relative to the central point 39 and the subject may determine the degree to which he considers he represents the trait. The closer the selected peg 43 is placed to the center point 39 the more prominent the subject individual considers that trait to be representative of him. Accordingly, in operation of the embodiment 31 the subject individual may refer to an individual trait on one of the list cards 47, select the cross-indexed peg 43 and place the peg in the containment field area 35 at the point the subject considers appropriate. The subject may then select another trait from the list card 47, select the appropriate peg 43 and repeat the process for that particular trait. Where the subject individual finds the selected space in the field 35 occupied by a previously positioned peg 43, the subject merely inserts the peg 43 into the well 55 of the previously positioned peg 43. Once completed, the subject may evaluate the pattern of the established field and make a recording. For example, the subject may take a photograph or make another facsimile of the pattern for subsequent evaluation and/or comparison. The apparatus further includes a plurality of list cards stacked horizontally on top of each other, on a variety of subjects, each containing a separate concept and its list of defining concepts.

Figure 3:
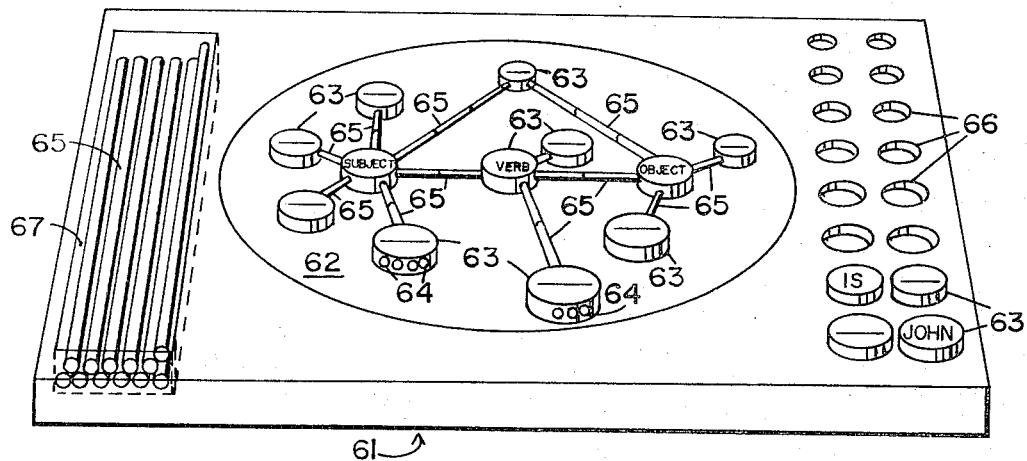
FIG. 3 is an alternative embodiment of the present invention in the form of a language acquisition system assessment program.

FIG. 3 illustrates a further embodiment of the present invention, referred to by the general reference character 61 and in the form of a language acquisition program point-vector assessment system. The structure 61 provides for the interrelating by a subject individual of a number of different concepts. For example, a sentence is a plurality of concepts interrelated. The structure 61 may be utilized to assess how the subject individual interrelates the concepts of the sentence.

The system 61 includes a containment field 62 and a plurality of semantic vehicles in the form of marker discs 63. Each disc 63 has a plurality of apertures 64 about its peripheral side surface. A plurality of marker interconnect spacers in the form of strips 65 are provided. The strips 65 may be of varying lengths and are adapted to be received by the apertures 64 of the discs 63. The length of each strip represents its quantitative value. Each disc 63 carries a designation for particular word or phrase. A certain word or phrase may serve as the nucleus or anchor point and the appropriate marker disc 63 may be selected and positioned within the field 62 relative thereto. The selected discs 63 are arranged in a sentence structure. The individual words may then be interconnected with other discs 63 by means of the interconnects 65. The apparatus 61 includes a plurality of storage wells 66 to support the individual discs 63 and a storage well 67 to support a number of strips 65 of substantially equal length and adapted to be segmented to desired lengths by the operator. The interconnects 65 may be selected by their length to interconnect certain discs 63 depending on the relative weight the subject individual gives to the relationship between the interconnected semantic vehicles. For example, the marker discs 63 positioned nearest the interconnected nucleus may be considered by the subject individual as contributing more weight to the meaning or definition of the concept or perception than those being a greater distance from the interconnected anchor point. Accordingly, the structure 61 provides apparatus for an individual subject to construct and establish a language acquisition point-vector assessment pattern. The pattern display within its internal structure and surface the semantic definitions carried by the marker disc 63 and their interdependent relationships defining the string of concepts. The strips 65 may function to physically retain two semantic vehicles in place in the field and function as the semantic distance selected by the subject individual as he relates the two interconnected semantic vehicles.

Figure 4:
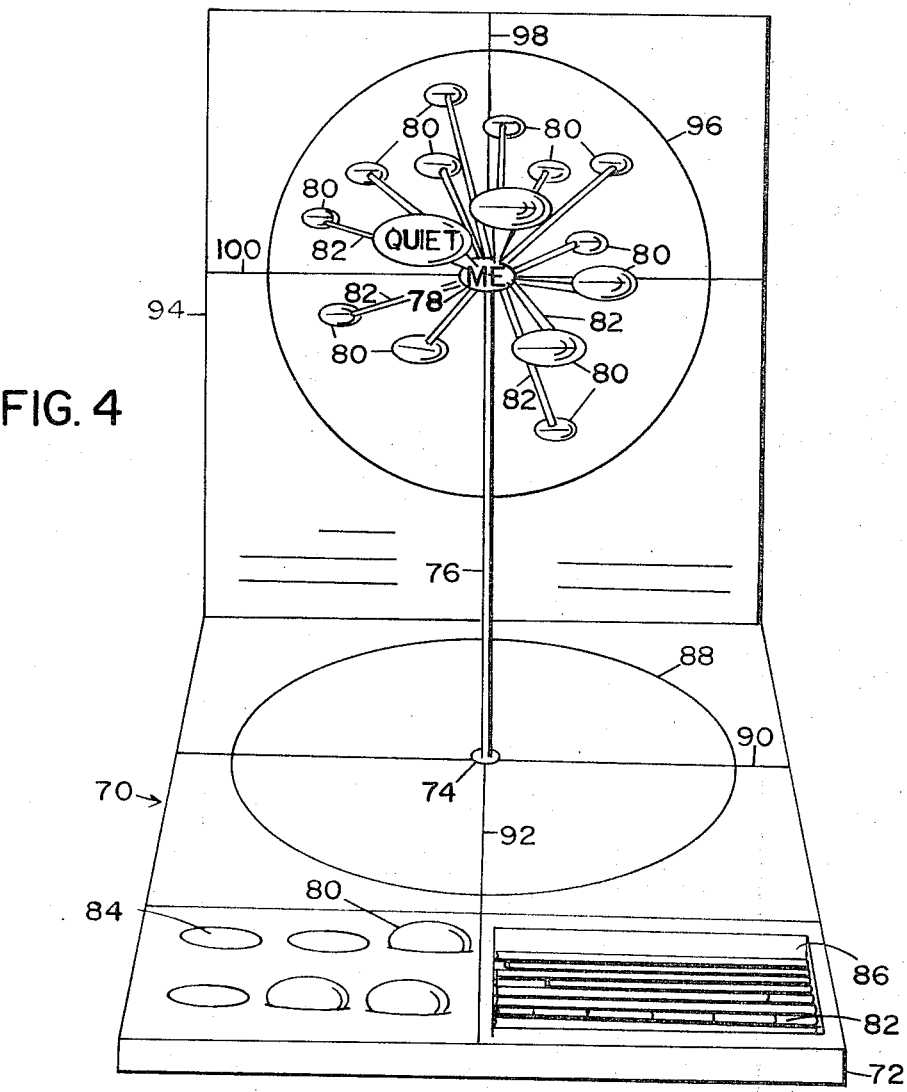
FIG. 4 is a perspective view of a global point-vector assessment system of the present invention.

FIG. 4 is a perspective view of a global point-vector assessment system, referred to by the general reference character 70. The apparatus 70 includes a base support 72 having a center point 74. An arm 76 projects vertically from the point 74 and supports at one end a marker 78 representative of the nucleus point. The marker 78 is spherical. A plurality of other spherical markers 80, each carrying a personality trait designation, are also provided. The various markers 80 are interrelated to the nucleus marker 80 by means of interconnects 82, the length of which signifies the relative weight the individual subject gives to said semantic vehicle relative to the nucleus.

The base support 72 carries a plurality of hemispherical wells 84 for supporting the markers 80 prior to placement by the subject individual. A rectangular shaped well 86 is provided to support a supply of the interconnects 82. Accordingly, an individual subject may construct a spherical point-vector assessment pattern.

The base support 72 carries a grid pattern with a outer circle 88, a horizontal line 90 and a vertical line 92. The base support 72, further supports an upright or vertical grid pattern 94 which carries an outer circle 96 and a pair of orthogonal lines 98 and 100. The constructed point-vector pattern may be recorded by taking photographs through the grid assessment patterns.

Figure 4A:
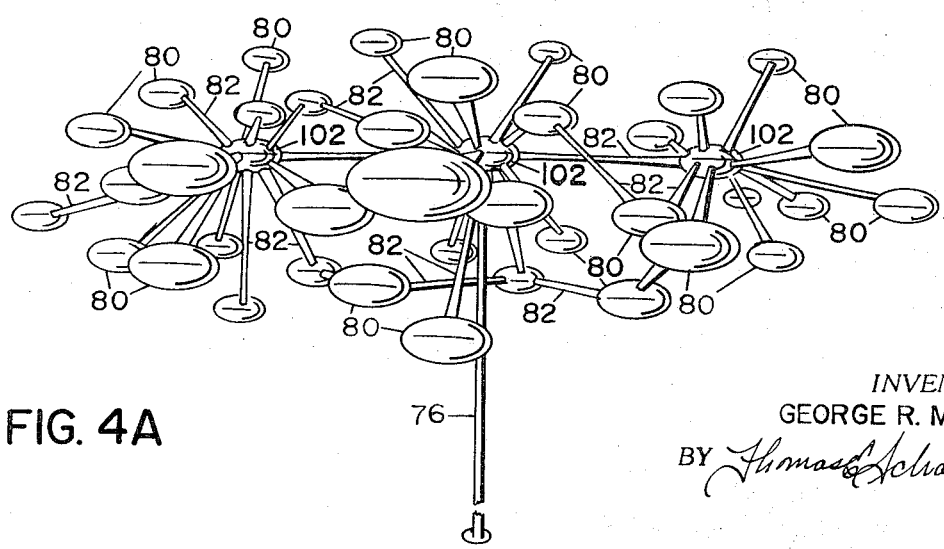
FIG. 4A is an alternative embodiment of the structure of FIG. 4 in the form of a language acquisition system assessment program.

FIG. 4A illustrates the global point-vector assessment system 70 for the interrelating of a plurality of different concepts in a global pattern. For example, as used as a language acquisition system to relate the various concepts of a sentence, the arm 76 joins a marker 102 carrying a designation of the verb. Another of the markers 102 carries the designation of the subject of the sentence and is interconnected by an interconnect 82. Likewise, another of the markers 102 carrying the designation of the object of the sentence is interconnected by an interconnect 82. The various other markers 80 carrying words or designations are interconnected to the subject, verb and/or object and/or to each other by means of the interconnects 82. The interconnect rods 82 represent the value vectors of the interconnected semantic vehicles represented by the markers 80.

I claim:

1. A morphogenic diagnostic apparatus for objective recording in units of semantic distance and value vectors in constructs, conception, perception, personality, language, communication and social structures, said apparatus comprising in combination:

an open field containment structure having a reference nucleus within an outer periphery of the field, the field containment structure being in the form of a polydimensional circular structure with all positions within the field having a vectorial relationship to said nucleus and adapted to receive individual positioned markers at any vectorial position relative to said nucleus and said outer periphery of the field, said nucleus being representative of an internal psychological reference of an individual human being;

a plurality of movable markers of substantially equal size and each bearing a semantic vehicle defining an independent internal personality concept of an individual human being, said markers being adapted for objective positioning by an individual person under diagnosis within the open field containment structure at any select vectorial position relative to said nucleus and independent of the position of any other marker positioned by said individual person within the field containment structure;

means for temporarily adhering each of said markers to the open field containment at the position selected by the individual under diagnosis within said outer periphery relative to said nucleus; and pattern assessment means for comparing a constructed pattern of said markers within said containment field, the pattern assessment means being movable relative to said field containment structure and adapted for folding over said field containment structure after said markers have been placed, the pattern assessment means including a reference pattern for referring to the constructed pattern of the markers on the field containment structure.

2. The morphogenic diagnostic apparatus of claim 1 in which the field containment structure is in the form of a circular pattern and in which the position of each marker comprises a magnitude and angular position relative to said nucleus.

3. The morphogenic diagnostic apparatus of claim 1 including a plurality of individual pattern assessment means engaged to the assessment structure and foldable over said field, each of said pattern assessment means having a distinct reference pattern and having means for the post measurement of a constructed pattern of said marker means within said containment field.

* * * * *